United States Patent [19]

Allen et al.

[11] 4,181,851

[45] Jan. 1, 1980

[54] AUTOMATIC ASTROPOSITION DETERMINATION APPARATUS

[75] Inventors: William A. Allen, Clinton, Md.; Pi-Fuay Chen, Alexandria, Va.

[73] Assignee: The United States of America as represented by the Secretary of the Army, Washington, D.C.

[21] Appl. No.: 880,734

[22] Filed: Feb. 24, 1978

[51] Int. Cl.$^2$ ................................................. G01J 1/20
[52] U.S. Cl. .................................. 250/203 R; 356/141
[58] Field of Search .................. 250/201, 203 R, 578, 250/216; 356/254, 255, 141, 152

[56] References Cited

U.S. PATENT DOCUMENTS

| | | | |
|---|---|---|---|
| 3,564,257 | 2/1971 | Berry et al. | 250/203 R |
| 3,653,774 | 4/1972 | La Roche | 356/254 |
| 3,852,714 | 12/1974 | Carson | 250/203 R |

Primary Examiner—David C. Nelms
Attorney, Agent, or Firm—Thomas O. Maser

[57] ABSTRACT

An automatic astroposition determination apparatus for performing measurements with improved precision and accuracy. A rectangular photosensor array is mounted in the focal plane of a theodolite and as the image of a star moves across the sensor array, a display of the image position and the time elapsed since the commencement of tracking is provided. Circuitry is provided to ensure that the leading edge of the star image on the array is tracked irrespective of how many photosensor elements the image overlies and irrespective of the direction of image transit on the array.

8 Claims, 7 Drawing Figures

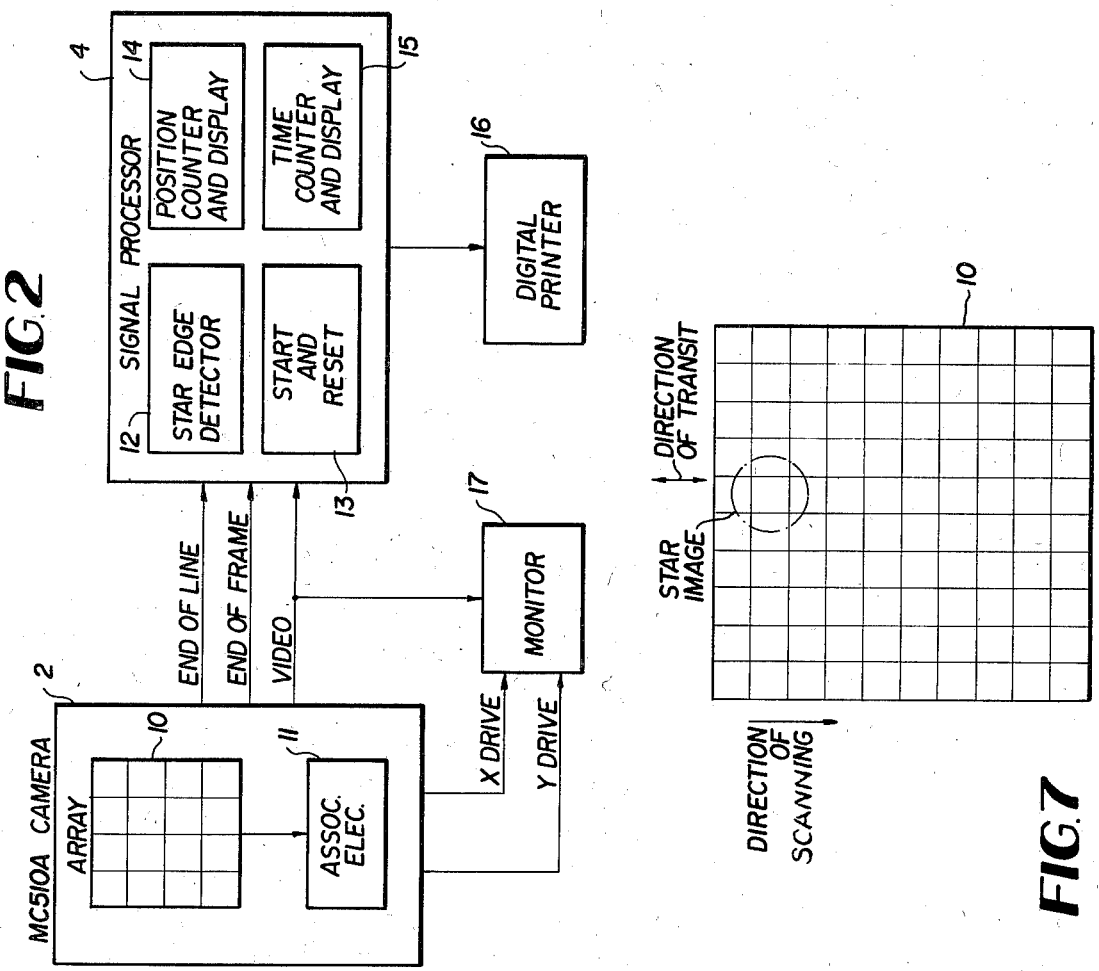
FIG. 2
FIG. 7
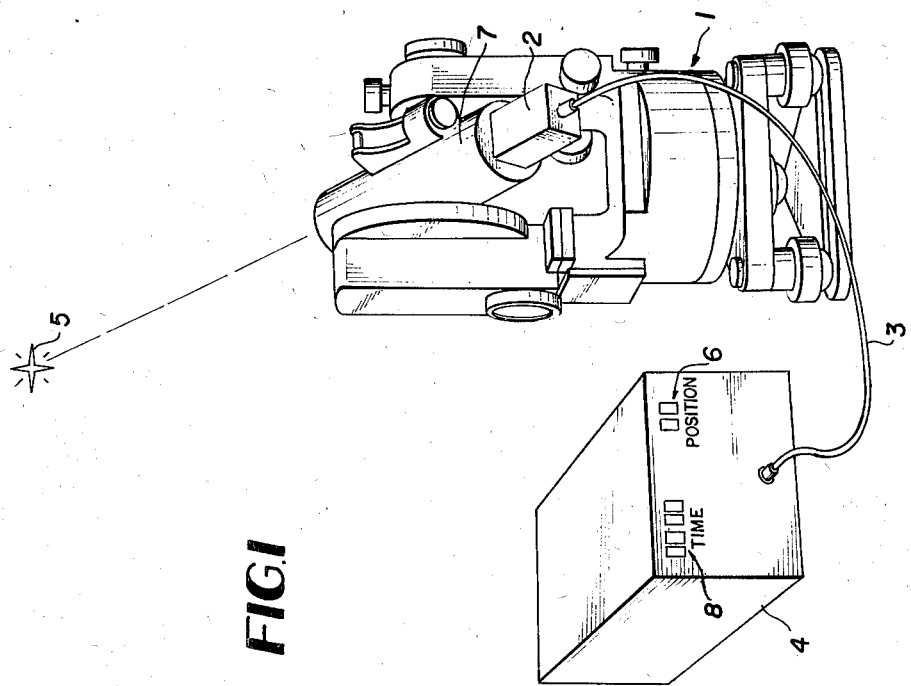
FIG. 1

AUTOMATIC ASTROPOSITION DETERMINATION APPARATUS

The present invention is directed to an automatic astroposition determination apparatus which provides astroposition measurements of improved precision and accuracy.

As is known, it is useful to determine the position and transits of stars as an aid in determining one's position on earth. Conventionally, to determine and follow the astronomical position of a star, manual sighting through a telescope or theodolite is effected. However, in such a case the resolution and accuracy of determining a star passing through the crosshairs of a micrometer in the theodolite and of tracking the star by turning the micrometer knob are solely dependent on the reaction time of the human observer, which is usually too long for accurate and satisfactory measurements to be performed.

Several different types of automatic star trackers have been proposed by the prior art. Frequently these trackers utilize a reticle having a plurality of slits, which is mounted in front of a photodetector. Either by rotating the reticle or by other means, an image of a star is caused to traverse the reticle, thereby intercepting specific slits dependent on the position of the image on the reticle, and causing the photodetector to emit a series of pulses corresponding to the specific slits which are intercepted. The pulse train is processed for instance, either by determining the time between respective pulses or by counting the total number of pulses, to determine the path which the image traverses across the reticle and the corresponding astroposition of the star being tracked.

One disadvantage of the reticle type as well as the other types of prior art astroposition determination systems has been their inability to provide precise measurements of star position and of changes in star position. Thus while being satisfactory for certain types of applications, the prior art systems have not been suitable for applications where very precise and accurate measurements of star transits must be made. Additionally, it is desirable to measure the star transits as a function of time, and many trackers of the prior art have not provided this capability.

It is therefore an object of the invention to provide an automatic astroposition determination apparatus which provides precise and accurate measurements of star positions and of star movements.

It is a further object of the invention to provide an apparatus which provides measurements of star transits as a function of time.

It is still a further object of the invention to provide an apparatus which can be utilized to implement the center of mass measurement technique, which results in very high system accuracy.

It is still a further object of the invention to provide an astroposition determination apparatus which can be adapted to determine both longitude and latitude without excessive calculation, which provides for convenient compensation of stray ambient light, and which allows dissection of a star image into a plurality of components which can be directly transformed into the Fourier domain for implementing techniques such as autocorrelation to reduce atmospheric refraction effects.

The above objects are accomplished by providing a theodolite instrument which is modified by replacing the crosshairs of the theodolite with a rectangular photosensor array. The telescope focusses an image of the star on the array and as the star moves the image moves across the array. The array is comprised of a large number of precisely positioned, highly miniaturized photosensors, is self-scanned, and when utilized in combination with the circuitry provided, is able to accurately measure and track the position of the star image on the array. Circuitry to measure and display the time elapsed as a function of star movement is also provided.

The invention will be better understood by referring to the accompanying drawings in which:

FIG. 1 is a pictorial illustration of an embodiment of the invention.

FIG. 2 is a generalized block diagram of the electronic circuit units of an embodiment of the invention.

FIG. 7 is a pictorial illustration of the photosensor array with a star image superimposed thereon.

Figure 3:
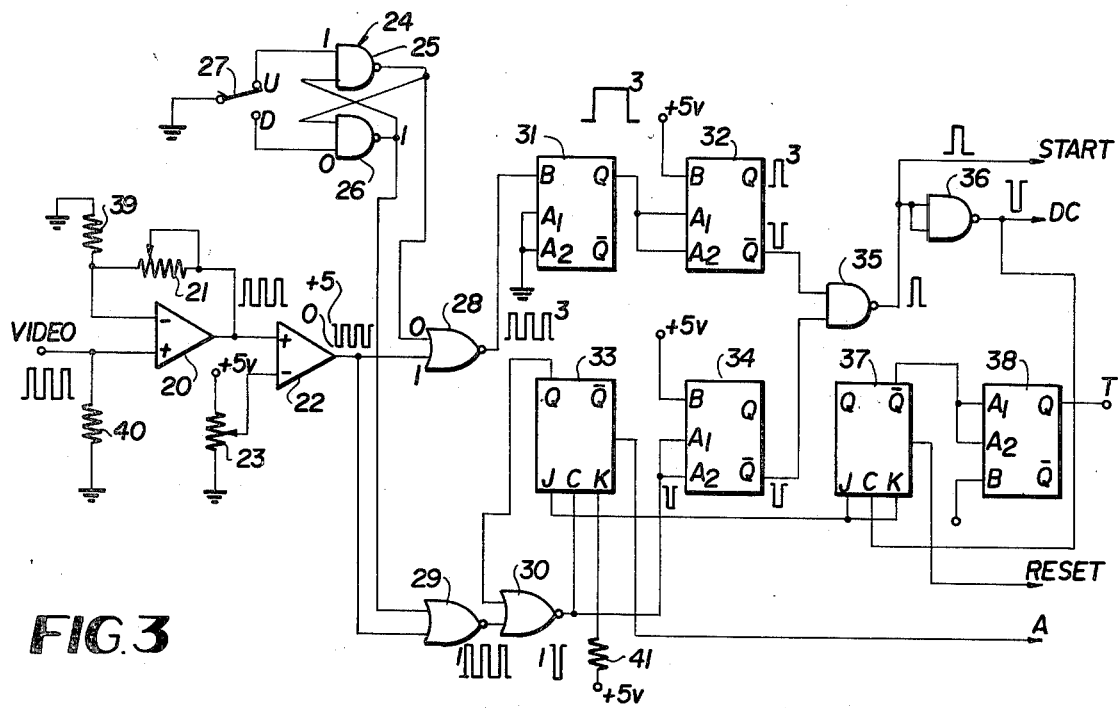
FIG. 3 is a circuit diagram of the star image leading edge detection circuitry.

FIG. 1 is a pictorial illustration of an embodiment of the invention. The apparatus is comprised of modified optical sighting instrument 1 and signal processor 4. The purpose of the apparatus is to determine and track the astronomic longitude of star 5, and as star 5 moves with respect to the earth, its position is displayed on position display 6 of signal processor 4 while the time elapsed relative to initial processing is displayed on time display 8.

Optical instrument 1 is a theodolite which is modified by removing the cross-hairs and substituting a photosensor array therefor. As is known, a theodolite is a standard optical instrument which is utilized for measuring both horizontal and vertical angles, and comprises a telescope which is swivel mounted on a base which is marked off in degrees. As can be seen in FIG. 1, telescope 7 is mounted for rotation in both the azimuthal and elevational directions. According to the present invention, the micrometer cross-hairs which are located at the focal plane are removed and are replaced with a rectangular photosensor array, which comprises part of package 2 in FIG. 1. Therefore, instead of being visually observed by the human eye, the image of star 5 is focussed somewhere on the face of the photosensor array.

Package 2 includes electronics for scanning the photosensor array and for providing selected outputs through cable 3. A hole is cut in package 2 immediately in front of the photosensor array, and to secure the package to the theodolite, tubing is attached to the hole so that the entire package can be inserted into the theodolite in place of the manual micrometer.

A block diagram of the electronic units of the apparatus is shown in FIG. 2. The heart of the apparatus is rectangular photosensor array 10, which is self-scanned by associated electronics 11. The photosensor array is comprised of a matrix of highly miniaturized, precisely located photosensors, across which the star image travels. The array and associated electronics are arranged to emit an end of line pulse, an end of frame pulse, and a video signal. These three signals are fed to signal processor 4 which is comprised of star leading edge detector 12, start and reset circuitry 13, position counter and display circuitry 14, and time counter and display circuitry 15. Each of these circuits is illustrated in detail in a subsequent FIGURE, and the output of signal processor 4, if desired, may be fed to digital printer 16, which prints a time record. Additionally, appropriate outputs of block 2, may be fed to the X drive and Y drive inputs of monitor 17, which displays a picture of the photosensor array and a visual depiction of the travel of the star image across the array.

The photosensor array 10 is preferably an array of highly miniaturized silicon photodiodes such as is manufactured by the Reticon Corporation. While the particular array used in the illustrative embodiment was a 50 by 50 matrix resulting in 2500 individual cells (the Reticon RA-50X50A), an array of any selected size may be utilized depending upon the precision of measurement desired. The array is self-scanned by associated electronics 11, and the specific electronics for effecting such scanning are well known in the art. Briefly, package 10 includes an X shift register and a Y shift register, each of which is fed by clock pulses, the X register outputs scanning respective columnar positions while the Y register output is held on a particular row position. After each row position is scanned, the X register is arranged to emit an end of line pulse, and the Y register then moves to the next row. At the end of one complete frame, the Y register is arranged to emit an end of frame pulse.

The photodiodes are arranged so that a video signal is not generated unless both an X scanning pulse and a Y scanning pulse are present across a particular photodiode. The video output is a train of current pulses, each containing a charge equal to the photocurrent in the corresponding scanned photodiode integrated over a frame time. The magnitude of the video signal corresponding to each particular photodiode is proportional to the intensity of the light which is incident on that photodiode. Suitable scanning electronics having the above characteristics are incorporated in the Reticon MC510A camera.

In the operation of the apparatus, the theodolite is rotated so that light from the star of interest is incident on the optics and on the photosensor array. To determine the astronomic longitude, the star is observed during meridian transit, and the array is positioned so that the star images pass perpendicularly across the rows of elements. This is illustrated in FIG. 7 which is a pictorial illustration of a photosensor array, and it is seen that the star image moves either up or down in the plane of the paper, perpendicularly to the rows of the elements.

Basically, the apparatus works by determining which row the star image overlies at a given time. This is accomplished by feeding the end of line signals to a counter, and gating the accumulated count through to the position display when the star image is detected in the video output. However, since the array elements in FIG. 7 are always scanned from top to bottom, and since the star image, also as illustrated in FIG. 7, may cover more than one row of array elements, two separate detecting circuits must be provided to detect the leading edges of upward and downward moving star images respectively.

For example, in FIG. 7, if the star image moves upwardly, then the first row having video therein which is detected by the downward scan of the array will be the row in which the leading edge of the star is located. However, if the star image moves down, then the first row in which video is detected does not include the leading edge of the star. Thus, the circuitry of FIG. 3 is provided to detect the leading edge of the star for both upwardly and downwardly directed image transits.

Assuming that the star image is located as is shown in FIG. 7, then the first three photosensor rows scanned produce, respectively, three video pulses. These pulses are shown in the circuit of FIG. 3 at the video input, and are fed to operational amplifier 20, the gain of which can be controlled by varying the resistance of feedback resistor 21. The pulses are amplified sufficiently to provide proper operation of comparator 22, and in the illustrative embodiment amplifier 20 amplifies the pulses by a factor of approximately 3. Comparator 22 inverts the pulses and is adjusted with potentiometer 23 so that only pulses above a noise threshhold level are passed.

In the case of downwardly moving star images, the appropriate signal path is through blocks 31 and 32 to result in a positive pulse output from NAND gate 35, and in the case of upwardly moving images, the appropriate signal path is through blocks 33 and 34 to result in a positive pulse output from NAND gate 35. If it is determined that the image transit is downwardly directed, then switch 27 is manually set to the D position while for upward movements it is set to the U position. Setting the switch to the D position causes flip-flop 24, which is comprised of NOR gates 25 and 26 to be set into the state in which the output of gate 25 is low while the output of 26 is high. The outputs of gates 25 and 26 are fed respectively to the inputs of NOR gates 28 and 29, and predispose gate 26 to pass the video signal and gate 29 to inhibit it while in the U position the opposite is true.

Referring to operation with switch 27 set to D, NOR gate 28 inverts the output of comparator 22. The video is inputted through retriggerable monostable multivibrator 31, which operates to detect the last pulse in the pulse train, thereby resulting in the detection of the leading edge of the downwardly moving star image. Retriggerable multivibrator 31 has an adjustable time constant, and has the property of timing out unless re-triggered before the time constant has elapsed. Such devices are known to those skilled in the art, and the particular unit used in the illustrative embodiment and shown in the drawing is the Texas Instruments 74123, TTL multivibrator.

Referring to FIG. 3, the leading edge of the first pulse of the pulse train sets the multivibrator, causing the Q output to go high. The time constant is arranged to be slightly greater than the duration of a line scan, so that if by the end of the time constant, if a second pulse is not received at input B of the multivibrator, time-out occurs, and the Q output goes low. However, if as in the case depicted in FIG. 3, a second pulse occurs before time-out, then the multivibrator is reset and the Q output remains high. For the case shown, the multivibrator will time-out and will have a negative going edge a time constant after the occurrence of the leading edge of the third pulse. Hence, the time of occurrence of the negative going edge of the Q output of multivibrator 31 is indicative of and is a time constant away from the time at which the leading edge of the star image is intercepted. The time constant difference does not affect operation since it stays the same as the image crosses the array.

The output signal from retriggerable monostable multivibrator 31 is fed to monostable multivibrator 32 which is responsive to the negative going edge of the input signal to generate narrow, fixed-width pulses of opposite polarities at the Q and $\overline{Q}$ outputs as shown in the FIGURE. The monostable multivibrator shown in the FIGURE is the Texas Instruments 74121. The negative pulse outputted at the $\overline{Q}$ output is fed to one input of NAND gate 35 which causes a positive pulse to be present at the output of the NAND gate and this pulse is the start pulse shown in FIG. 3. The start pulse is inverted by inverter 36 and the inverted pulse is the DC pulse shown in FIG. 3.

While the above occurs with switch 27 set to the D position, if it is determined that the star image is moving upwardly across the array, then switch 27 is set to the U position, thereby enabling NOR gate 29 and inhibiting NOR gate 28. J-K flip-flop 33, which is illustrated as being a Texas Instruments 74H106, is in the cleared state, with output Q being low and output $\overline{Q}$ being high. Assuming that the video again consists of three successive pulses, NOR gate 30 passes the first pulse, which is inverted at the output of the gate, and the negative output pulse is fed to the clock input of flip-flop 33, thus causing the flip-flop to change state, with the Q output now becoming high and the $\overline{Q}$ output becoming low. Thus, further pulses at the input of NOR gate 30 are inhibited, and only the first pulse is passed, which is correct, since we are interested in detecting the leading edge of the star, which in the case of the upwardly moving star, is represented by the first pulse. The negative pulse output of NOR gate 30 is fed to the input of monostable multivibrator 34 which is arranged to generate fixed length output pulses in response to a negative going leading edge at the input. The negative $\overline{Q}$ output pulse of multivibrator 34 is fed to one input of NAND gate 35, which causes an inverse of the input pulse to be outputted. Hence, the result is the same whether an upwardly moving or downwardly moving image is detected with the same start and DC pulses being generated in both cases.

Figure 4:
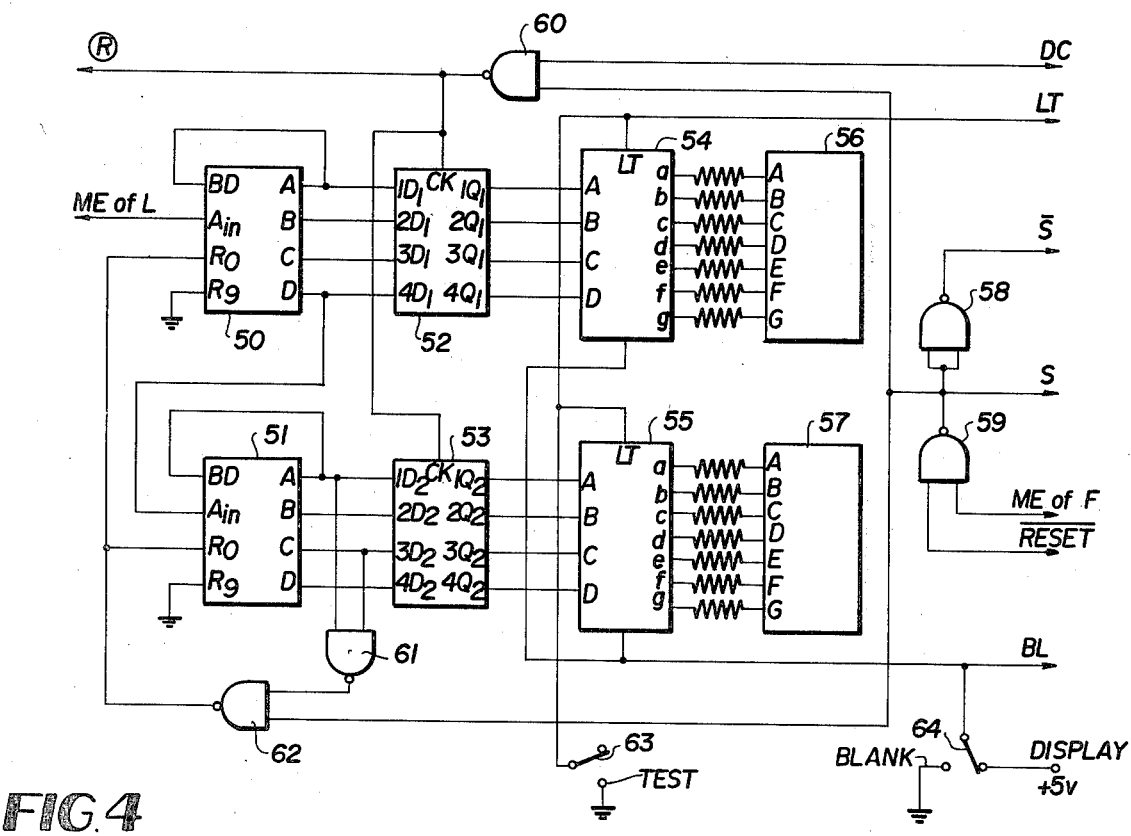
FIG. 4 is a circuit diagram of the position counter and display circuitry.
Figure 6:
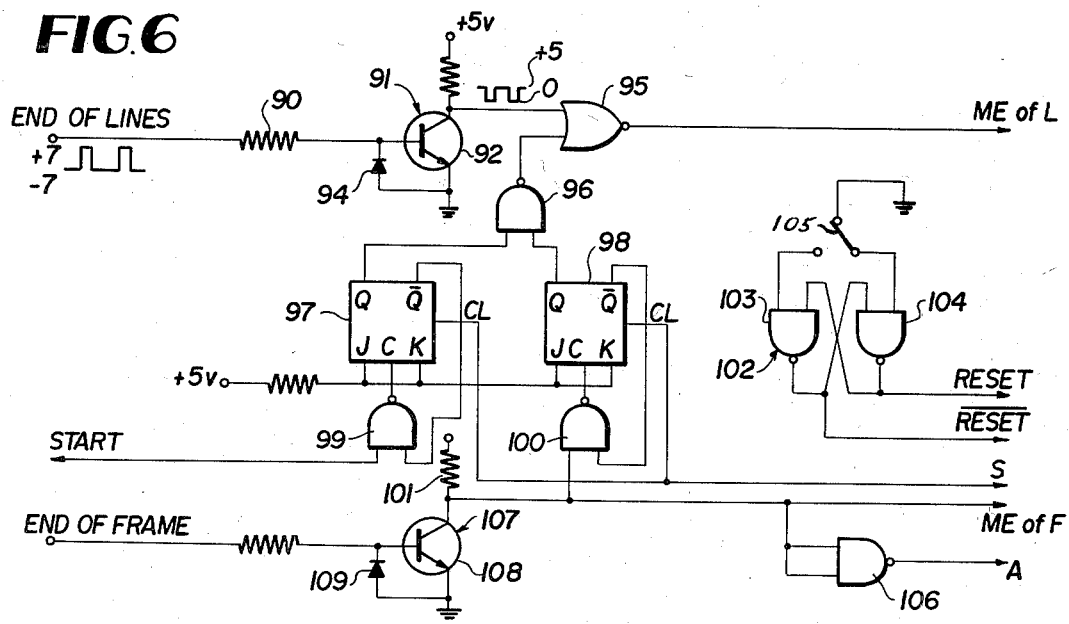
FIG. 6 is a circuit diagram of the start and reset circuitry.

To begin operation of the apparatus, referring to FIG. 6, switch 105, which is a push button switch, is closed, causing flip-flop 102, which is comprised of NAND gates 103 and 104, to become set. In this state, the output of NAND gate 104 which is the reset output is low while the output of NAND gate 103 which is the $\overline{reset}$ output is high. Referring to FIG. 4, the $\overline{reset}$ output is fed to one input of NAND gate 59. The end of frame pulses are shown as being inputted at the bottom left-hand of FIG. 6 and they are passed through level converter 107, comprised of transistor 108 and diode 109 to convert the CMOS ±7 volts swing of the end of frame pulses to the 0 to +5 volts TTL level. After passing through level converter 107, the modified end of frame pulse is fed to the other input of NAND gate 59. Since both the modified end of the frame pulse and the reset pulse are high, the output of NAND gate 59 which is the S pulse, is low.

Referring to FIG. 6, the S pulse is inputted to the clear input of J-K flip-flops 97 and 98, thus causing the $\overline{Q}$ outputs of the flip-flops to be high while the Q outputs are low. When the start pulse, which as explained above, is generated by the circuitry of FIG. 3 as a result of the video detection of a leading edge, is generated, it is inputted to NAND gate 99, thereby causing a negative-going pulse to be generated at the output of the NAND gate. This pulse is fed to the clock input of J-K flip-flop 97, which clocks the flip-flop and causes the Q output to go high. This output is fed to one input of NAND gate 96, but the output of the NAND gate does not go low until the Q output of J-K flip-flop 98 also goes high. The first modified end of frame pulse after video is detected, is fed to one input of NAND gate 100. Since flip-flop 98 is cleared, the $\overline{Q}$ output is high, and upon the occurrence of the modified end of frame pulse, the output of NAND gate 100 goes low, thus causing the flip-flop to be clocked, and causing the Q output to go high and the $\overline{Q}$ output to go low. This then prevents further end of frame pulses from clocking flip-flop 98, and the flip-flop does not change state until the reset button is pushed again and flip-flop 98 is cleared. With the Q outputs of both J-K flip-flops 97 and 98 high, both inputs to NAND gate 96 are high, and the output thereof goes low.

The end of line pulses from camera 2 are fed into level converter 91 at the left-hand top of FIG. 6. After their level is converted, they are gated through NOR gate 95. However, this gating does not occur until the Q outputs of both flip-flops 97 and 98 are high, and it is thus the function of the circuitry of FIG. 6 to begin gating end of line pulses through NOR gate 95 after video has been detected and the first end of frame pulse has occurred.

Figure 5:
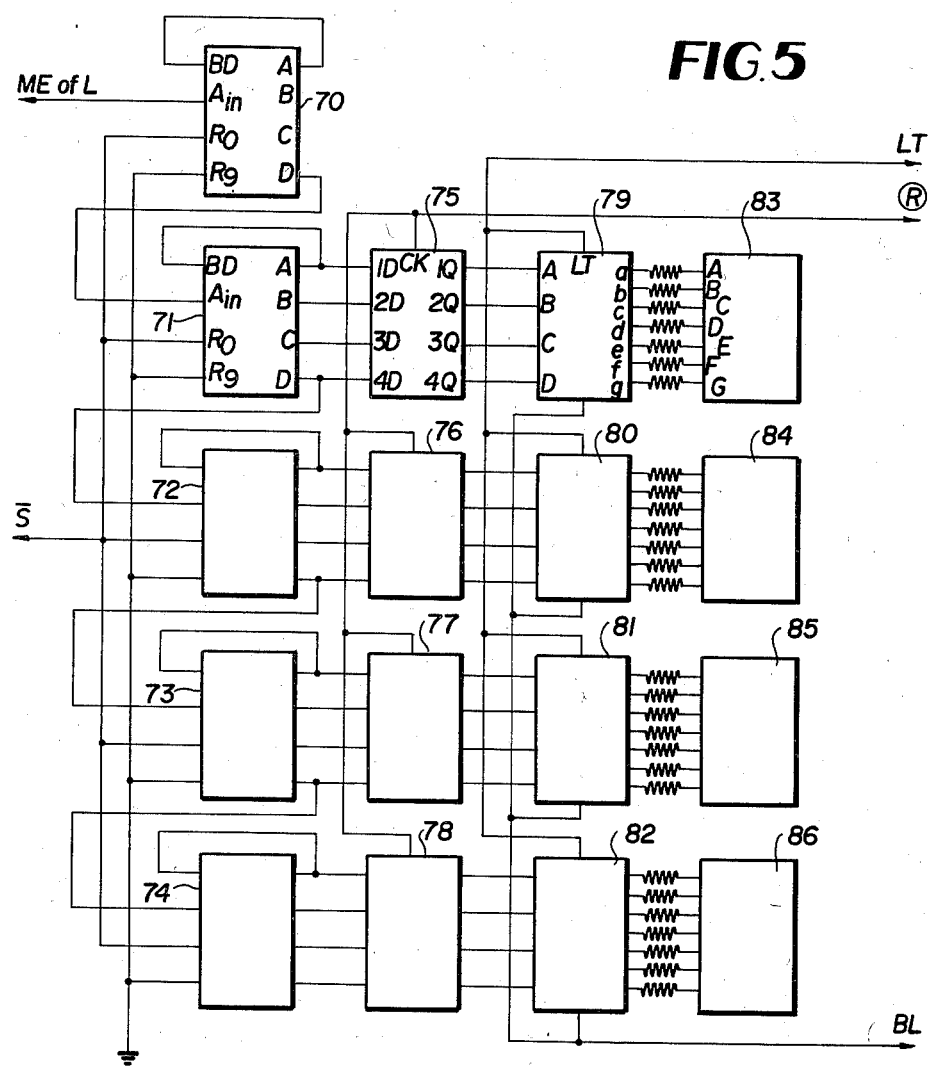
FIG. 5 is a circuit diagram of the time counter and display circuitry.

FIG. 4 is a schematic diagram of the position counter and display, and FIG. 5 is a schematic diagram of the time counter and display. The function of the counters is to count the end of line pulses, the accumulated count being gated out to the display when the leading edge of the star image is detected. Referring to FIG. 4, the modified end of line pulses are fed into the count or A$_{in}$ input of counter 50. The output of the last stage of counter 50 is fed into the A$_{in}$ input of "ten's" counter 51, and since in the illustrative embodiment the array used has 50 rows, the counters are arranged to automatically reset after the count of 50 has been reached. This is effected, as known to those skilled in the art, by appropriate connection of the first and third stages (10+40) of counter 51 to NAND gate 61, the output of which is connected to one input of NAND gate 62. The output of NAND gate 62 is connected to the reset or R$_o$ inputs of counters 50 and 51 to reset the counters when the count of 50 has been reached. The actual counters used in the illustrative embodiment and illustrated in FIG. 4 are the Texas Instruments SN7490 units.

As described above, when the leading edge of a star image is detected, the circuitry of FIG. 3 generates a negative-going DC pulse output. In FIG. 4, the DC pulse is fed to one input of NAND gate 60, thus causing the output of the NAND gate to go high. The output stages of counters 50 and 51 are connected to the inputs of latches 52 and 53 respectively, which in the illustrative embodiment are Texas Instruments SN7475 units. The output of NAND gate 60 is connected to the clock output of the latches, thus causing the count accumulated in the counters to be latched when the DC pulse occurs and the output of NAND gate 60 goes high.

The outputs of latches 52 and 53 are connected to the inputs of decoders 54 and 55 respectively, which decode the binary-coded input signals to provide a group of output signals which is appropriate for activating one's display 56 and ten's display 57. The displays may for instance be multi-segment light-emitting diode displays, and the decoding and display circuity is well-known to those skilled in the art. If desired, the circuitry selected may include provisions for testing the display, and for blanking it, and appropriate switches to perform these functions are shown at 63 and 64 respectively.

The time counter and display is illustrated in FIG. 5, and is seen to be similar to the position counter and display. Modified end of line pulses are counted by counters 70–74, and the accumulated count is latched through to decoders 74 to 82 and displays 83 to 86 by latches 75 to 78 when the leading edge of the star image is detected. To arrive at the actual time elapsed, it is necessary to multiply the number displayed by counters 83 to 86 by the time of one line scan. Unlike the position counters, time counters 70 to 74 are not reset after one frame, but count continuously, and enough stages are provided to count for the duration of a star image transit across the array. Closing reset switch 105 causes the $\overline{S}$ pulse to reset counters 70 to 74. If desired, the apparatus can also include a time recorder to provide a printed record of the time. Such recorders are well known in the art and require no elaboration. In the illustrative embodiment, to make the input consistent with the recorder speed, the pulse frequency is divided by two before being inputted to the recorder. As shown in FIG. 3, this division is performed by multivibrators 37 and 38, with the T output being inputted to the time recorder.

Thus, an automatic astroposition determination apparatus of high precision and accuracy has been described. The position display shows the real-time position of the star image as it travels across the photosensor array, and the time display shows the time elapsed since the image entered the field. Additionally, a time recorder prints the time information, and the position information can be correlated with the printed time information. The correlated information can be used to calculate the apparent velocity rates of the stars being measured or can be used to obtain transit information for general astronomical determinations. With the photosensor array used in the illustrative embodiment the resolution obtained was 0.3 arc second with higher resolutions being obtainable with arrays having higher photosensor densities. Stars down to +3.5 magnitude were detected with detection of fainter stars up to the 6th or 7th magnitude being possible if the array were cooled in a chamber.

The large number of identical and equally spaced array photosensors provides a convenient means for obtaining repeated measurements of star transits, which yields better accuracy because an average value may be taken. Also, the rectangular coordinate configuration of the array allows the center of mass measurement techniques to be implemented if desired, resulting in even higher accuracies. This technique is described in an article by P. F. Chen entitled "Center of Mass Measurement Using An Array System" on page 78 of the March 1973 Transactions of the IEEE on Instrumentation and Measurement.

By adding, counting and comparison circuitry position determination in two directions can be performed. Stray ambient light can be compensated for by frame subtraction on chip and if desired the star image can be dissected and transformed into the Fourier domain for performing autocorrelation.

While we have described and illustrated an embodiment of our invention, we wish it to be understood that we intend to cover all modifications thereof which would be apparent to one skilled in the art and which come within the spirit and scope of our invention.

We claim:

1. An automatic astroposition determination apparatus for determining and tracking the astronomic position of a star, comprising,
    swivel mounted telescope means for sighting said star and for focussing an image thereof at a focal plane,
    a two dimensional rectangular array of photosensors having photosensors disposed in both the x and y directions located at said focal plane, said image of said stars being focussed on said array,
    means for electrically scanning said array of photosensors row by row to determine the location of said focussed image on said array in at least one of said x and y directions, said location on said array changing in correspondence with changes in the astroposition of said star,
    display means, and
    means reponsive to said scanning for causing an indication of the location of said image on said array to be displayed on said display means, and for generating a signal indicative of the row which the leading edge of said star image overlies, said signal generating means further including means: (a) for generating an end of line signal responsive to said means for scanning, (b) for completing the scanning of each row, and (c) for generating a video signal when said means for scanning scans a photosensor which the leading edge of said star image overlies.

2. The apparatus of claim 1 further for determining said changes in star position as a function of time, further comprising, means for measuring the relative time as the position of said star image on said array changes, and means for displaying said relative time, whereby the position of said star and the relative time can be correlated.

3. The apparatus of claim 1 wherein said means for generating a signal indicative of said row which the leading edge of said star image overlies includes counting means for counting said rows being scanned in response to successive ones of said end of line signals and latch means for causing the count to be displayed responsive to the occurrence of said video signal.

4. The apparatus of claim 3 wherein said video signal generating means includes bi-directional compensation means for generating a signal which corresponds to the leading edge of said star image irrespective of the direction in which said star image is moving on said array and irrespective of how many photosensors the star image overlies.

5. The apparatus of claim 4 wherein said photosensor array is scanned in a given direction, said scanning means producing a plurality of successive detection pulses when said star image overlies a plurality of adjacent rows, said bidirectional compensation means including means for generating said video signal in time correspondence with the first of said successive detection pulses when said star image moves in the direction opposite to the direction of said scanning and means for generating said video signal in time correspondence with the last of said detection pulses when said star image moves in the same direction as the direction of said scanning.

6. The apparatus of claim 5 further including means for inhibiting the counting of said end of line signals until a video signal is generated and the remainder of the frame in which said video signal is generated, is scanned.

7. The apparatus of claim 5 wherein said bi-directional compensation means includes retriggerable monostable multivibrator mans.

8. The apparatus of claim 7 wherein said video signal generating means includes comparator means for discriminating against noise.

* * * * *